United States Patent
Leyerle et al.

(10) Patent No.: US 6,397,517 B1
(45) Date of Patent: Jun. 4, 2002

(54) BAIT STATION WITH INTERIOR MECHANICAL RODENT TRAP

(75) Inventors: Rick Leyerle; Daniel C. Johnson, both of Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 09/560,382

(22) Filed: Apr. 28, 2000

(51) Int. Cl.⁷ .................. A01M 25/00; A01M 23/24
(52) U.S. Cl. .................. 43/131; 43/58; 43/88
(58) Field of Search .............. 43/131, 58, 114, 43/81, 81.5, 82, 83, 83.5, 88, 90, 92, 93

(56) References Cited

U.S. PATENT DOCUMENTS

| | | | | |
|---|---|---|---|---|
| 794,323 A | * | 7/1905 | Small | 43/131 |
| 1,349,177 A | * | 8/1920 | Wiemer | 43/81 |
| 1,633,982 A | * | 6/1927 | Davis | 43/131 |
| 2,568,168 A | * | 9/1951 | Query | 43/131 |
| 2,714,780 A | * | 8/1955 | Glover | 43/131 |
| 2,763,093 A | * | 9/1956 | Scott et al. | 43/131 |
| 2,944,364 A | * | 7/1960 | Kelley | 43/131 |
| 3,303,600 A | * | 2/1967 | Freeman | 43/131 |
| 4,026,064 A | * | 5/1977 | Baker | 43/131 |
| 4,208,829 A | * | 6/1980 | Manning | 43/131 |
| 4,270,299 A | * | 6/1981 | Long | 43/58 |
| 4,349,982 A | * | 9/1982 | Sherman | 43/131 |
| 4,453,337 A | | 6/1984 | Williams | |
| 4,462,182 A | | 7/1984 | French | |
| 4,541,198 A | * | 9/1985 | Sherman | 43/131 |
| 4,550,525 A | | 11/1985 | Baker et al. | |
| 4,611,426 A | * | 9/1986 | Willis | 43/131 |
| 4,619,071 A | | 10/1986 | Willis | |
| 4,637,162 A | | 1/1987 | Sherman | |
| 4,660,320 A | * | 4/1987 | Baker et al. | 43/131 |
| 4,793,093 A | * | 12/1988 | Gentile | 43/131 |
| 4,831,775 A | * | 5/1989 | Sherman | 43/131 |
| 4,835,902 A | * | 6/1989 | Sherman | 43/131 |
| 5,040,327 A | * | 8/1991 | Stack et al. | 43/131 |
| 5,136,803 A | * | 8/1992 | Sykes et al. | 43/131 |
| 5,148,624 A | * | 9/1992 | Schmidt | 43/81 |
| 5,272,832 A | | 12/1993 | Marshall et al. | |
| 5,588,249 A | * | 12/1996 | Flinner | 43/61 |
| 5,628,143 A | | 5/1997 | Doucette | |
| 5,806,237 A | | 9/1998 | Nelson et al. | |
| 5,857,286 A | * | 1/1999 | Doucette | 43/131 |
| 5,930,944 A | * | 8/1999 | Knuppel | 43/114 |
| 5,966,863 A | | 10/1999 | Payton et al. | |
| 6,082,042 A | * | 7/2000 | Issitt | 43/131 |
| 6,158,166 A | * | 12/2000 | Snell et al. | 43/131 |

FOREIGN PATENT DOCUMENTS

GB         555429 B1 *   8/1943    ............ 43/81

OTHER PUBLICATIONS

PROTECTA® Bait Station, ©Bell Laboratories, Inc., Available web site: http://www.bellabs.com/cgi/products.cgi?op=p&nm=domeprotbs.*

* cited by examiner

*Primary Examiner*—Darren W. Ark
(74) *Attorney, Agent, or Firm*—Lathrop & Clark LLP

(57) ABSTRACT

An injection molded plastic body has a lid joined by a living hinge. A rodent passageway extends within the body between two aligned holes. The hinge is perpendicular to the passageway, allowing the lid to be opened when the body is fixed adjacent a building wall. The interior of the body is divided by a raised wall which is broken into two segments by an opening to a blind passageway extending perpendicular to the passageway. Two rodent feeding areas are positioned adjacent the blind passageway. Bait blocks are positioned within each feeding area on protrusions which are received within axially extending central holes. The blocks are clamped between underlying rings and cooperating structure depending downwardly from the lid. Instead of bait, a mechanical trap maybe positioned on two of three protrusions aligned along the blind passageway. The mechanical trap inter-fits with the protrusions to positively position the mechanical trap.

19 Claims, 3 Drawing Sheets

BAIT STATION WITH INTERIOR MECHANICAL RODENT TRAP

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to rodent bait stations and rodent traps.

Rodents are persistent pests, presenting a continual threat to health and goods wherever humans dwell or carry on business. Rodents continue to be a source of disease and economic damage through spoilage of food and non-food items alike. Although ancient scourges such as bubonic plague are rare, rodents are linked to such modem diseases as spirochetal and tick-borne diseases and hantavirus disease.

Rodents are generally controlled through poison or traps. Poison and traps have been placed within specialized containers, called bait stations, to prevent children, non-targeted animals, and unauthorized individuals from coming into contact with the poison or the trap. Bait stations are designed to isolate the poison or trap from ready access to all but the targeted rodents. A typical bait station has a plastic or metal box within which is placed a trap or poison bait. Typically, bait stations are placed along walls and other places where rodents are likely to frequent. To prevent animals or children from gaining access to the contents of bait stations by tipping or shaking, a bait station is often screwed or nailed to the floor or other structure. To maintain the effectiveness of the bait station, the bait must be replaced periodically or traps within the bait station must be emptied and reset. Bait is often in the form of grain mixed with paraffin and rodenticide which is cast or extruded into blocks, Such blocks are resistant to spoilage due to moisture and serve to prevent the targeted rodents from scattering the bait.

What is needed is a bait station which can easily be opened while affixed to the floor and which can accommodate bait or a trap and positively position the bait or trap within the bait station.

SUMMARY OF THE INVENTION

The bait station of this invention incorporates an injection molded body with an openable lid joined to the body by an integrally formed living hinge. The body defines a rectangular box having a passageway defined by two aligned holes. The passageway is positioned adjacent and parallel to a first side of the box. The hinge is formed along a second side of the box perpendicular to the first side. In use, the first side and the passageway are positioned along a wall so that the hinge is perpendicular to the wall and the lid can readily be opened without interference from the wall even if the body is fixedly mounted to the floor adjacent the wall. The side of the lid opposite the hinge is lockable to the body along a third side by twin prongs, which prevent opening without a key. The interior of the body is divided by a raised wall which runs parallel to the side adjacent the passageway. The raised wall is broken into two equal parts by an opening leading away from and perpendicular to the passageway. The opening leads into a blind passageway terminating at a fourth wall of the body opposite the first wall. The passageway and the co-joined blind passageway form a T-shaped interior arrangement to the bait station interior. Partial walls on either side of the blind passageway which extend from the raised wall to the fourth body wall form feeding areas between the partial walls and the second and third sides. Within each feeding area on each side of the blind passageway two raised protrusions are surrounded by raised rings. Bait blocks having axially extending central holes fit over the raised protrusion, and are clamped between the raised rings and cooperating structure depending downwardly from the lid. A mechanical trap is positioned on two of three raised bosses aligned along the blind passageway. The mechanical trap has portions which inter-fit with the bosses to positively position the mechanical trap within the blind passageway. The bait station will normally be used with either bait blocks or a mechanical trap.

It is an object of the present invention to provide a bait station suitable for use with rodenticide bait or a mechanical trap.

It is a further object of the present invention to provide a bait station which facilitates access when affixed against a wall.

It is another object of the present invention to provide a bait station which positively holds bait blocks.

Further objects, features and advantages of the invention will be apparent from the following detailed description when taken in conjunction with the accompanying drawings.

DESCRIPTION OF THE PREFERRED EMBODIMENTS

Figure 1:
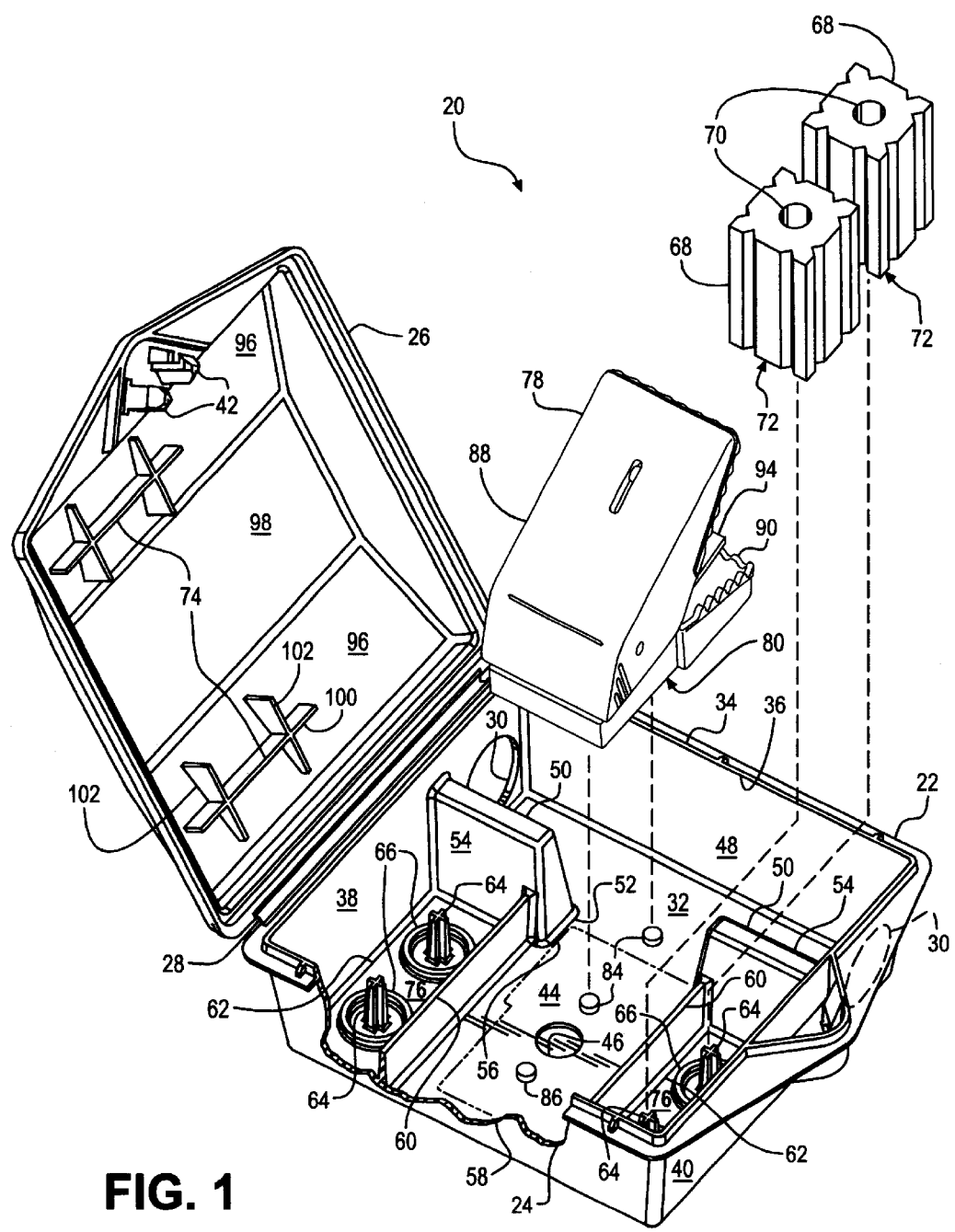
FIG. 1 is an exploded isometric view, partially broken away in section, of the bait station and rodent trap assembly of this invention.
Figure 2:
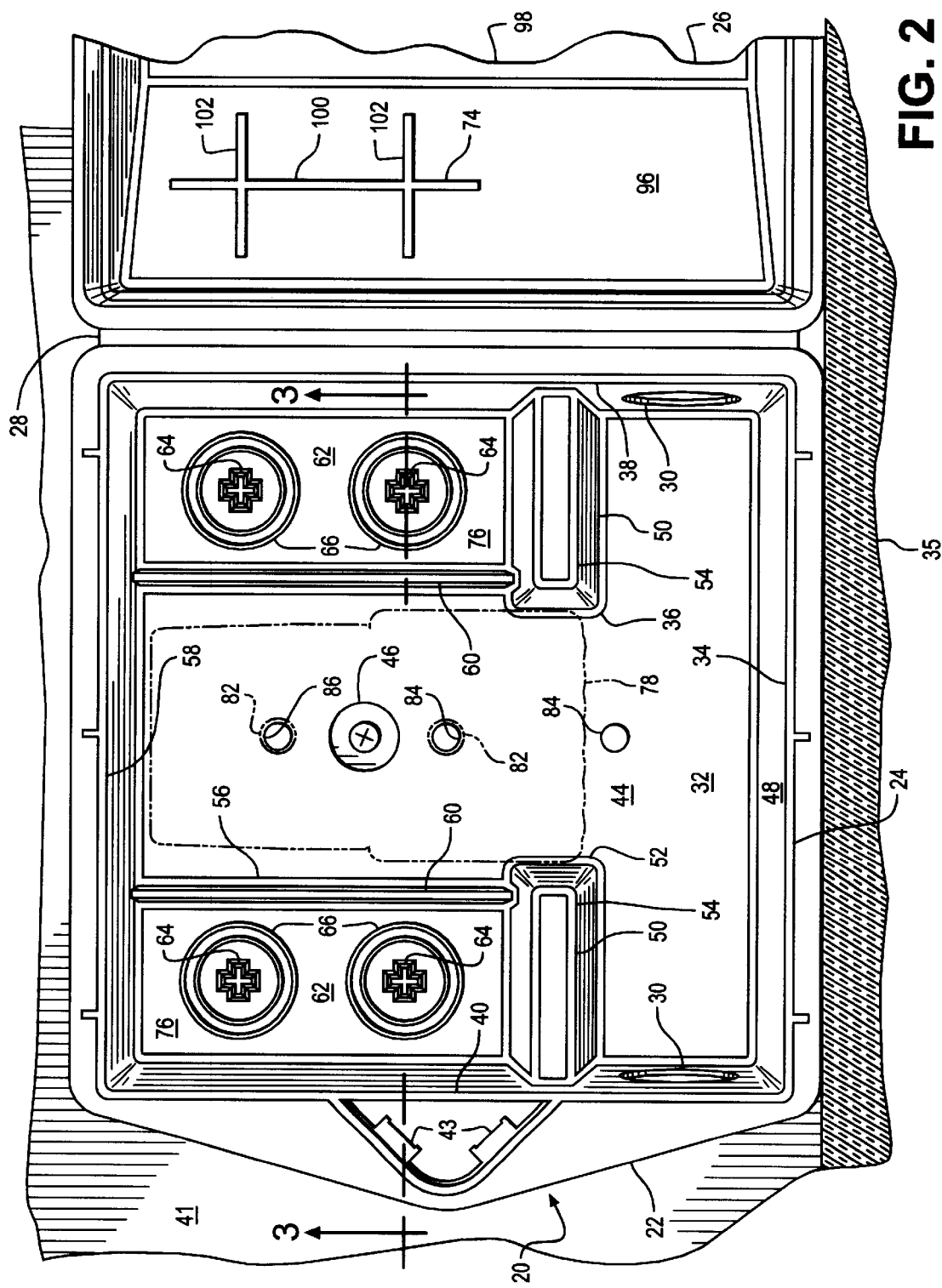
FIG. 2 is a top plan view of the opened bait station of FIG. 1 with a rodent trap positioned therein.
Figure 3:
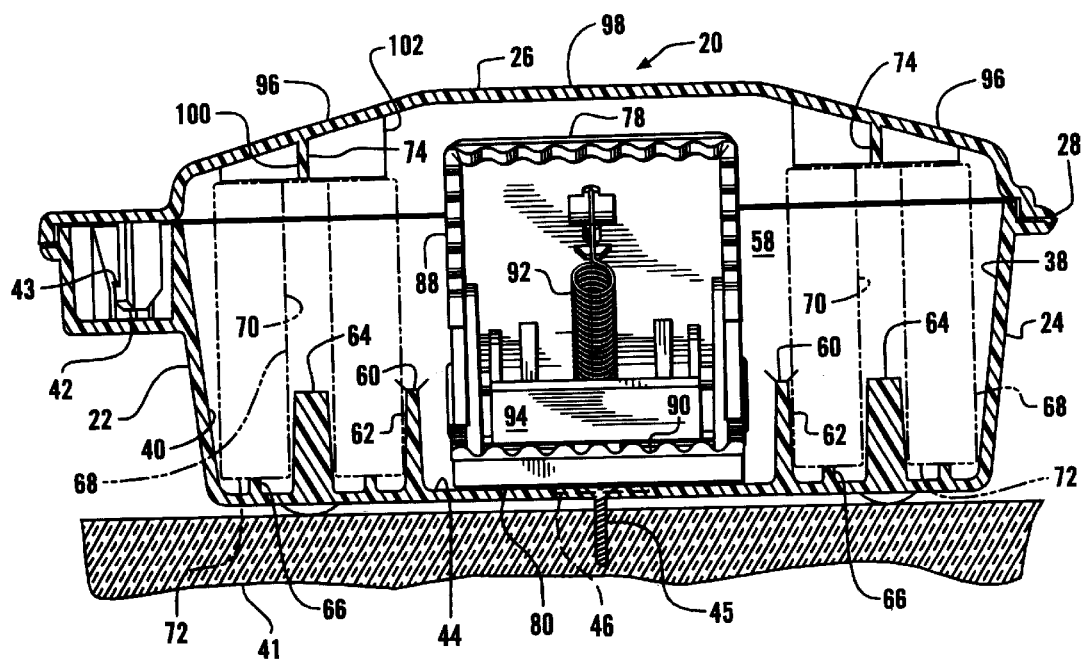
FIG. 3 is a cross-sectional view of the assembly of FIG. 2 in a closed configuration, taken along section line 3—3.

Referring more particularly to FIGS. 1–3, wherein like numbers refer to similar parts, a bait station 20 is shown in FIG. 1. The bait station 20 is configured to receive a rodent destructive element positioned within a portion of the box accessible from the passageway, for example rodent bait blocks 68 or mechanical rodent traps 78. The bait station 20 has a body 22 having the shape of a rectangular box 24 with a lid 26.

The body 22 is joined to the lid 26 by an integrally formed living hinge 28. The body 22, lid 26, and hinge 28 may be formed as a single injection molded part. The rectangular box 24 has four walls which extend upwardly from a bottom wall 44: a first wall 34 which will typically be placed along the building wall 35; a second wall 38 extending approximately perpendicular to the first wall, and from which the hinge 28 extends; a third wall 40 which extends from the first wall parallel to the second wall; and a fourth wall 58 which extends between the second wall and the third wall. The second wall 38 and the opposed third wall 40 have portions which define two aligned rodent openings 30 which define a passageway 32 through the bait station 20. The openings 30 are positioned on the second and third walls adjacent to the first wall 34 of the box 24. The passageway 32 extends along the interior 36 of the box 24 parallel to a first side wall 34.

Mice and rats generally move along walls and are most willing to enter a bait station when a path through the bait station can be seen. Therefore the bait station 20 in use is positioned with the first wall 34 and the passageway 32 parallel to a building wall 35. The lid 26 has two downwardly protruding prongs 42, as shown in FIG. 1, which are releasably enagable with two mating ledges 43 which are positioned outwardly from the third wall 40, as shown in FIG. 3. The resilient prongs 42 permit the lid to be locked to the third wall 40, thereby preventing opening without a key, in a fashion similar to the locking structures disclosed in U.S. Pat. No. 5,040,327, the disclosure of which is incorporated herein by reference.

To prevent lifting and shaking of the bait station 20, or other displacement of the station from its intended position, it may be nailed or screwed to the floor 41 adjacent the building wall 35 by driving a fastener such as a nail or screw 45 through the bottom wall 44 of the box 24. An area of thinner material 46 is provided for this purpose as shown in FIGS. 1 and 2. Because the hinge 28 is perpendicular to the building wall 35, the lid 26 can be freely opened while the first wall 34 is fixed against the wall 35. Because of the position of the hinge 28 relative to the passageway 32, access to the lock formed by the resilient prongs 42 and the ledges 43 is not impeded by the presence of the building wall 35.

Within the body 22 of the bait station 20, the passageway 32 is defined between the interior surface 48 of the first wall 34 and a raised interior wall 50 which extends parallel to and spaced from the first wall 34. The raised interior wall 50, as shown in FIG. 1, has an opening 52 which divides the raised interior wall 50 into two segments 54. The opening 52 leads into a blind passageway 56 which extends from the fourth wall 58 of the box 24 to intersect perpendicularly with the passageway 32. The passageway 32 and the blind passageway 56 form a T-shaped pattern of pathways within the body 22 of the bait station 20.

Partial walls 60 extend upwardly from the bottom wall 80 on either side of the blind passageway 56. Each partial wall 60 extends between a segment 54 of the raised interior wall 50 and the fourth wall 58, defining a feeding area 62 with either the second wall 38 or the third wall 40. Two cross-shaped protrusions 64 extend upwardly within each feeding area 62. Each protrusion is encircled by a raised ring 66. The station 20 is baited by positioning rodent bait blocks 68 comprised of rodent meal mixed with paraffin and rodenticide within the feeding areas 62. Each bait block 68 is provided with an axially extending hole 70, which receives a cross-shaped protrusion 64 therein. The upright orientation of bait blocks 68 presents them for gnawing by rodents, while the raised rings 66 elevate the blocks above condensation or other fluid which may accumulate within the station 20. The lower surfaces 72 of the bait blocks 68 rest on the raised rings 66.

As best shown in FIG. 3, protruding structures 74 on the lid 26 of the bait station 20 are positioned above the raised rings 66 and capture or engage the bait blocks 68. The protrusions 64 extend less than the full height of the supported bait blocks 68, and are thus easier to form in the molding process, furthermore, they are not so long as to become flexible or prone to being broken off. By engaging the blocks between portions of the base and the lid, the bait is held against being shaken out and removed through the openings 30, and is presented for optimal feeding by rodents. The access and arrangement of the feeding areas 62 is such as to discourage fouling of the bait by the action of the targeted rodents. As shown in FIG. 1, the lid has two sloping segments 96 which extend downwardly from a top segment 98. The protruding lid structures 74, as shown in FIG. 2, may be formed as a double cross extending downwardly from a sloping segment 96. Each structure 74 has a long member 100 and two short members 102. The intersections between the long member 100 and the short members are centered over the protrusions 64.

Typically when bait is used, the rodenticide causes the targeted rodents to become thirsty and thus leave the building before dying. In some circumstances, however, the size of the building or the availability of water means some targeted rodents may die within inaccessible portions of a building, creating an unpleasant odor. Where such problems arise the use of mechanical traps is effective. To prevent the traps from being misplaced or endangering children and non-targeted animals, the traps may be placed within the bait station 20.

As shown in FIGS. 1–3, a mechanical trap 78 may be positioned in one of two positions, entirely or partially within the blind passageway 56. The mechanical trap may be of the type disclosed in U.S. patent application Ser. No. 29/113,430, the disclosure of which is incorporated by reference herein. The mechanical trap 78 has a striker 88 which is pivotally connected to a base 90, with a spring 92 which serves to close the trap when a trigger 94 is actuated. The underside 80 of the trap base 90 is positioned against the bottom wall 44 of the box 24. Two cylindrical recesses or indentations 82 are formed in the base 90 of the trap 78, as indicated in FIG. 2. Three cylindrical nubbins or protrusions 84 extend upwardly from the station bottom wall 44 and are regularly spaced along the center of the blind passageway 56. The mechanical trap 78 may thus be placed within the bait station in two defined locations, to engage either the first and second of the protrusions 84, or the second and third protrusions.

In either event, the protrusions restrict rotation and translation of the trap 78 within the bait station 20. The closure of the lid 26 on the base limits vertical movement of the trap 78. The mechanical trap 78 is sized to fit between the partial walls 60, the bottom 44, and the lid 26. Furthermore, the trap 78, at its widest, is received in the opening 52 between the two interior wall segments 54. The protrusions 84 on the bottom 44 are spaced so that the mechanical trap 78 may be positioned protruding slightly into the passageway 32 or alternatively using the rearmost protrusion 86, the mechanical trap 78 may be recessed into the blind passageway 56. In the first position, the trap 78 is positioned to be actuated by the sideways entry of a rodent, in the second position the trap is positioned to be actuated by the frontward entry of a rodent.

The inter-fitting indentations 82 on the mechanical trap 78 and the protrusions 84, 86 on the bottom 44 of the body 22 of the bait station 20 allow for adjustable, positive positioning of the mechanical trap 78. Repeatable placement of the mechanical trap 78 facilitates duplicating a successful trapping strategy, removing trap placement as an uncontrolled variable in achieving rodent suppression within a facility. Adjustability provides controlled variability of trap placement which can result in better overall trapping success if trap position is varied from time to time. Furthermore, although positioning of the mechanical traps 78 is restricted when the lid is closed, once the lid is opened the traps are readily removed from the interior and emptied and reset. In addition, because the traps 78 are restricted from movement once they are engaged within the bait station 20, the user may refrain from setting the traps until they are positioned, at which time it is only necessary to depress the rear of the striker 88 with one hand, avoiding the possibility of accidentally setting off the trap by moving it while set, or of setting off the trap on a portion of the user.

It should be understood that the structure 74 protruding from the lid may be in the form of a cone or portions of a cone which extend downwardly to engage the holes 70 in the bait blocks 68. Moreover, the trap 78 and the bait station 20 may be scaled for mice or for rats or other targeted species.

It should be understood the bait blocks 68 are held between the bottom 80 and lid 26, and are thus substantially rigidly positioned with respect to the body 20 to the bait station 20.

It is understood that the invention is not limited to the particular construction and arrangement of parts herein illustrated and described, but embraces such modified forms thereof as come within the scope of the following claims.

We claim:

1. A rodent trap comprising;
    a body having a bottom wall and a plurality of upwardly extending side walls, wherein portions of the body define two opposed rodent openings to admit rodents into the body, the rodent openings being formed in opposed side walls, and wherein a passageway adjacent one of the sidewalls is defined extending between the two opposed rodent openings, the passageway and the two opposed rodent openings being aligned;
    a lid which overlies the body and which is selectably lockable to the body, the lid being hinged to one of said opposed side walls;
    a mechanical rodent trap which is positionable in a set position to strike and capture a rodent upon actuation, wherein the rodent trap has a base with a plurality of recesses formed therein, the rodent trap being received within the body to overlie the bottom wall; and
    at least two projections extending upwardly from the body bottom wall, the projections extending into the rodent trap recesses to positively position the overlying rodent trap with respect to the body, and to position the set trap such that a rodent entering one of the rodent openings is directed to the set trap.

2. A rodent trap comprising:
    a body having a bottom wall and a plurality of upwardly extending side walls, wherein portions of the body define two opposed rodent openings to admit rodents into the body;
    a lid which overlies the body and which is selectably lockable to the body;
    a mechanical rodent trap which is positionable in a set position to strike and capture a rodent upon actuation, wherein the rodent trap has a base with a plurality of recesses formed therein, the rodent trap being received within the body to overlie the bottom wall; and
    at least two projections extending upwardly from the body bottom wall, the projections extending into the rodent trap recesses to positively position the overlying rodent trap with respect to tie body, and to position the set trap such that a rodent entering one of the rodent openings is directed to the set trap, wherein at least three aligned projections extend upwardly from the body bottom wall, and wherein the distance between the first projection and the second projection is the same as the distance between the second projection and the third projection, such that the mechanical trap may be engaged alternatively with the first and the second projections, or with the second and the third projections.

3. The bait station of claim 2 wherein a rodent passageway is defined between the opposed rodent openings, and wherein a blind passageway extends perpendicular to the rodent passageway, and wherein two of said at least three aligned projections are positioned along the blind passageway, and one of said at least three aligned projections is positioned along the rodent passageway, such that the rodent trap may be positioned to engage rodents entering from the side of the trap or from the front of the trap.

4. A rodent bait station for retaining and presenting rodent bait blocks having axially extending central openings, the bait station comprising:
    a body, having a plurality of side walls which extend upwardly from a bottom wall, the side walls defining an enclosed box having two opposed openings for the passage into the box of rodents, the openings being located in opposed side walls, wherein a passageway is defined within the body adjacent a side wall connecting the opposed side walls, the passageway being aligned with the two opposed openings;
    a lid which is hinged to one of the opposed side walls, and which is selectably locked to secure the lid to the body, and restrict the admittance into the body of non-targeted animals and humans;
    at least one first projection extending upwardly from the body bottom wall, the at least one first projection extending upwardly less than the height of the body side walls, the at least one first projection being receivable within the axially extending central opening of a rodent bait block; and
    at least one second projection extending downwardly from the lid when the lid is closed on the body, the at least one second projection being positioned directly over the at least one first projection, wherein the at least one second projection is spaced above the at least one first projection and not in contact with the at least one first projection, the at least one second projection being positioned to engage a rodent bait block mounted on the at least one first projection and retain said bait block in position within the body.

5. A bait station comprising:
    a body forming a box having a bottom wall, a first side wall extending upwardly from the bottom wall, a second side wall adjoining the first side wall, and a third side wall opposite the second side wall and adjoining the first side wall;
    a lid joined to the second side wall by a hinge and engageable with the third side wall to lock the lid to the box;
    a passageway defined between a first hole in the second side wall and a second hole in the third side wall, the holes being aligned to provide a visible path through the body of the bait station, the passageway being adjacent to and parallel to the first side wall, the passageway extending beneath the lid when the lid is locked to the box, wherein the first hole, the second hole, and the passageway are aligned with one another;
    an interior wall extending upwardly from the bottom of the box, the interior wall together with the first wall defining the passageway within the box;
    portions of the interior wall forming an opening leading to a blind passageway, portions of the box bottom wall forming a bottom to the blind passageway; and
    a mechanical trap positioned within the blind passageway, portions of the mechanical trap interengaging with engaging portions of the bottom wall within the blind passageway, to position and retain the mechanical trap within the body of the bait station.

6. The bait station of claim 5 further comprising two parallel walls extending between the interior wall and a fourth wall defining the blind passageway, the two parallel walls extending only part way towards the lid, wherein the two parallel walls define feeding areas on either side of the blind passageway, each feeding area having at least one first protrusion extending from the bottom wall of the box part way toward the lid, the at least one first protrusion being receivable within a central axial hole of a rodent bait block to retain said bait block in an upright orientation.

7. The bait station of claim 6 further comprising at least one protruding structure extending downward from the lid above the at least one first protrusion, the at least one protruding structure being positioned to close upon and restrain a rodent bait block supported on the at least one first protrusion, wherein the at least one protruding structure is spaced from the at least one first protrusion when the lid is closed on the base.

8. The bait station of claim 5 wherein the engaging portions of the bottom wall which engage with the mechanical trap comprise at least two spaced projections which extend upwardly from the bottom wall, and wherein the interengaging portions of the mechanical trap comprise at least two recesses positioned to overlie said at least two spaced projections.

9. A bait station comprising:
a body forming a box having a bottom wall, a first side wall extending upwardly from the bottom wall, a second side wall adjoining tee first side wall, and a third side wall opposite the second side wall and adjoining the first side wall;
a lid joined to the second side wall by a hinge and engageable with the third side wall to lock the lid to the box;
a passageway defined between a first hole in the second side wall and a second hole in the third side wall, the holes being aligned to provide a visible path through the body of the bait station, the passageway being adjacent to and parallel to the first side wall, the passageway extending beneath the lid when the lid is locked to the box;
an interior wall extending upwardly from the bottom of the box, the interior wall together with the first wall defining the passageway within the box;
portions of the interior wall forming an opening leading to a blind passageway, portions of the box bottom wall forming a bottom to the blind passageway; and
a mechanical trap positioned within the blind passageway, portions of the mechanical trap interengaging with engaging portions of the bottom wall within the blind passageway, to position and retain the mechanical trap within the body of the bait station, wherein the engeging portions of the bottom wall which engage with the mechanical trap comprise at least two spaced projections which extend upwardly from the bottom wall, and wherein the interengaging portions of the mechanical trap comprise at least two recesses positioned to overlie said at least two spaced projections; and
wherein at least three aligned projections extend upwardly from the body bottom wall, and wherein the distance between the first projection and the second projection is the same as the distance between the second projection and the third projection, such that the mechanical trap may be engaged alternatively with the first and the second projections, or with the second and third projections.

10. A bait station comprising:
a body forming a rectangular box having a bottom wall, a first side wall extending upwardly from the bottom wall, a second side wall adjoining the first side wall, and a third side wall opposite the second side wall and adjoining the first side wall, and a fourth side wall adjoining the second and third side walls and opposite the first side wall;
a lid joined to the second side wall by a hinge and engageable with the third side wall to lock the lid to the box;
a passageway defined between a first hole in the second side wall and a second bole in the third side wall, the holes being aligned to provide a visible path through the body of the bait station, the passageway being adjacent to and parallel to the first side wall, wherein the first hole, the second hole, and the passageway are aligned with one another;
an interior wall extending upwardly from the bottom of the box in spaced parallel relation to the first side wall, the interior wall defining the passageway within the box;
portions of the interior wall forming an opening leading to a blind passageway, the blind passageway extending substantially perpendicular to the passageway and terminating at the fourth side wall of the box, portions of the box bottom wall forming a bottom to the blind passageway; and
a mechanical trap positioned within the blind passageway, portions of the mechanical trap interengaging with portions of the bottom wall within the blind passageway, to position and retain the mechanical trap within the body of the bait station.

11. The bait station of claim 10 further comprising two parallel walls extending between the interior wall and the fourth wall defining the blind passageway, the two parallel walls extending only part way towards the lid, wherein the two parallel walls define feeding areas on either side of the blind passageway, each feeding area having at least one first protrusion extending from the bottom of the box part way toward the lid, the at least one first protrusion being receivable within a central axial hole of a rodent bait block to retain said bait block in an upright orientation.

12. The bait station of claim 11 further comprising at least one protruding structure extending downward from the lid above the at least one first protrusion, the at least one protruding structure being positioned to close upon and restrain a rodent bait block supported on the at least one first protrusion, wherein the at least one protruding structure is spaced from the at least one first protrusion when the lid is closed on the box.

13. The bait station of claim 10 wherein the portions of the bottom wall which engage with the mechanical trap comprise at least two spaced projections which extend upwardly from the bottom wall, and wherein the interengaging portions of the mechanical trap comprise at least two recesses positioned to overlie said at least two spaced projections.

14. A bait station comprising:
a body forming a rectangular box having a bottom wall, a first side wall extending upwardly from the bottom wall, a second side wall adjoining the first side wall, and a third side wall opposite the second side wall and adjoining the first side wall, and a fourth side wall adjoining the second and third side walls and opposite the first side wall;
a lid joined to the second side wall by a hinge and engageable with the third side wall to lock the lid to the box;

a passageway defined between a first hole in the second side wall and a second hole in the third side wall, the holes being aligned to provide a visible path through the body of the bait station, the passageway being adjacent to and parallel to the first side wall;

an interior wall extending upwardly from die bottom of the box in spaced parallel relation to the first side wall, the interior wall defining the passageway within the box;

portions of the interior wall forming an opening leading to a blind passageway, the blind passageway extending substantially perpendicular to the passageway and terminating at the fourth side wall of the box, portions of the box bottom wall forming a bottom to the blind passageway; and a mechanical trap positioned within the blind passageway, portions of the mechanical trap interengaging with portions of the bottom wall within the blind passageway, to position and retain the mechanical trap within the body of the bait station, wherein the portions of the bottom wall which engage with the mechanical trap comprise at least two spaced projections which extend upwardly from the bottom wall, and wherein the interengaging portions of the mechanical tap comprise at least two recesses positioned to overlie said at least two spaced projections, and wherein at least three aligned projections extend upwardly from the body bottom wall, and wherein the distance between the first projection and the second projection is the same as the distance between the second projection and the third projection, such that the mechanical trap may be engaged alternatively with the first and the second projections, or with the second and third projections.

15. A bait station mounted within a building comprising:

a building floor;

a building wall extending substantially vertically upwardly from the building floor;

a body forming a box having a bottom wall;

a fastener extending through the bottom wall to affix the body to the floor of the building, adjacent to the building wall;

a plurality of walls extending upwardly from the bottom wall;

a lid joined to a first of said plurality of walls by a hinge and engageable with a second of said plurality of walls to lock the lid to the box, the lid pivoting freely about the hinge without interference from the wall;

a passageway defined between a first hole in said first of said plurality of walls, and a second hole in said second of said plurality of walls, the holes being aligned to provide a visible path through the body of the bait station, the passageway being adjacent to and parallel to the building wall and extending beneath the lid, wherein the first hole, the second hole, and the passageway are aligned with one another.

16. A bait station mounted within a building comprising:

a building floor;

a building wall extending substantially vertically upwardly from the building floor;

a body forming a box having a bottom wall;

a fastener extending through the bottom wall to affix the body to the floor of the building adjacent the building wall;

a first side wall extending substantially upwardly from the bottom wall, the first wall being substantially parallel to and adjacent to the building wall;

a second side wall adjoining the first side wall;

a third side wall opposite the second side wall and adjoining the first side wall;

a lid joined to the second side wall by a hinge and engageable with the third side wall to lock the lid to the box, the lid pivoting freely about the hinge without interference from the building wall;

a passageway defined between a first hole in the second side wall and a second hole in the third side wall, the holes being aligned to provide a path through the body of the bait station, the passageway being adjacent to and parallel to the first side wall and the building wall, the passageway being beneath the lid, wherein the first hole, the second hole, and the passageway are aligned with one another;

a rodent destructive element positioned within a portion of the box accessible from the passageway.

17. The bait station mounted within a building of claim 10 wherein the rodent destructive element comprises a block containing rodenticide and held between the bottom wall and the lid.

18. The bait station mounted within a building of claim 16 wherein the rodent destructive element comprises a mechanical trap positioned within the body, portions of the mechanical trap interengaging with portions of the bottom wall to position and retain the mechanical trap within the body.

19. The bait station mounted within a building of claim 16, further comprising:

an interior wall extending upwardly from the bottom wall of the box, the interior wall together with the first wall defining the passageway within the box; and portions of the interior wall forming an opening leading to a blind passageway.

* * * * *